UNITED STATES PATENT OFFICE.

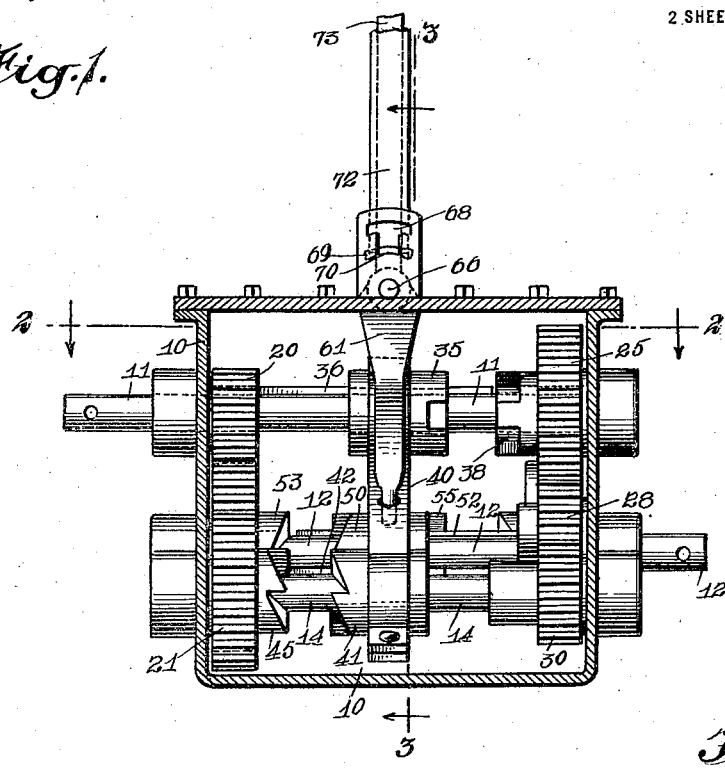

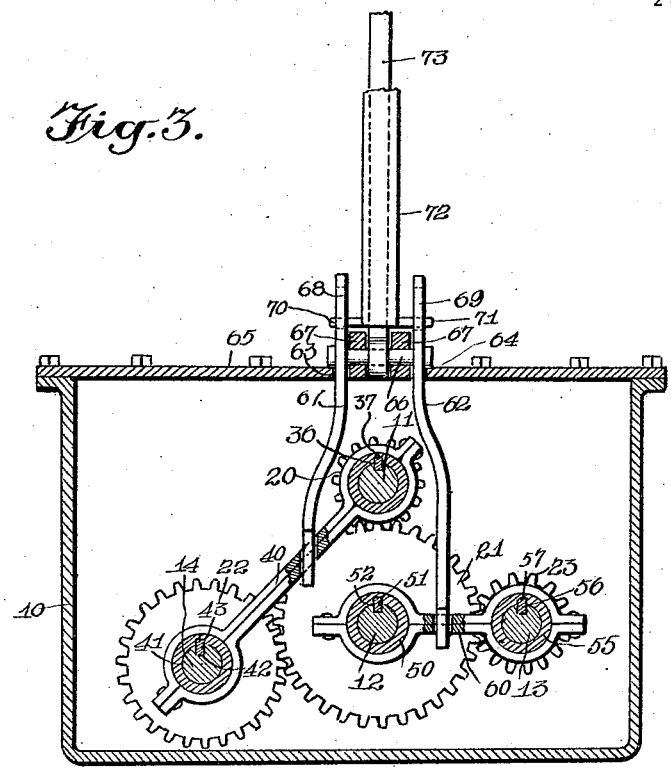

GEORGE Q. SEAMAN, JR., OF BROOKLYN, NEW YORK.

CHANGE-SPEED GEARING.

1,419,770. Specification of Letters Patent. Patented June 13, 1922.

Application filed October 27, 1920. Serial No. 419,953.

*To all whom it may concern:*

Be it known that I, GEORGE Q. SEAMAN, Jr., a citizen of the United States, and a resident of the city of New York, Canarsie, borough of Brooklyn, in the county of Kings and State of New York, have invented a new and Improved Change-Speed Gearing, of which the following is a full, clear, and exact description.

The invention relates to change speed gearing, such as shown and described in the Letters Patent of the United States, No. 1,236,113, granted to George Q. Seaman on August 17, 1917.

The object of the present invention is to provide a new and improved change speed gearing more especially designed for use on automobiles and other power driven vehicles and devices, and arranged to permit the operator to conveniently change the speed from a lower to a higher speed or vice versa or to reverse.

Another object is to render the gearing exceedingly compact.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved speed gearing with the shifting mechanism in neutral position, the section being on the line 1—1 of Figure 2;

Figure 2 is a sectional plan view of the same on the line 2—2 of Figure 1;

Figure 3 is a transverse section of the same on the line 3—3 of Figure 1;

Figure 4 is a diagrammatic view of the change speed gearing and showing the parts in neutral, high and reverse positions; and Figure 5 is a similar view of the same showing the parts in neutral, first and second positions.

The improved change speed gearing is mounted in a suitable gear casing 10 in which is journaled a power or engine shaft 11, a driven shaft 12, a countershaft 13, and a reversing shaft 14. On the power shaft 11 within the gear casing 10 is secured a pinion 20 in mesh with a gear wheel 21 mounted to rotate loosely on the driven shaft 12 at the left hand side of the gear casing 10. The gear wheel 21 is in mesh at one side with a gear wheel 22 mounted to rotate loosely on the reversing shaft 14, and the said gear wheel 21 is in mesh at its other side with a pinion 23 fixed on the countershaft 13. On the power or engine shaft 11 is mounted to rotate loosely a gear wheel 25 within the casing and in mesh with a pinion 26 fixed on the driven shaft 12. The pinion 26 is in mesh at one side with a gear wheel 27 mounted to rotate loosely on the countershaft 13, and the other side of the said pinion 26 is in mesh with an intermediate gear wheel 28 mounted to turn on a stud 29 held on the casing 10. The intermediate gear wheel 28 is in mesh with a pinion 30 secured on the reversing shaft 14.

A clutch member 35 is mounted to slide on and to turn with the power or engine shaft 11 by the use of a suitable key 36 fixed on the shaft 11 and engaging a corresponding keyway 37 on the clutch member 35. The clutch member 35 is adapted to engage a clutch member 38 attached to or forming part of the gear wheel 25 and hence when the clutch member 35 is in engagement with the clutch member 38 then the rotary motion of the power or engine shaft 11 is directly transmitted by the gear wheel 25 and pinion 26 to the driven shaft 12 to rotate the latter at a high speed. The clutch member 35 is connected by a connecting member 40 with a clutch member 41 mounted to slide on and to turn with the reversing shaft 14 by the use of a key and keyway 42, 43, and the clutch member 41 is adapted to engage a clutch member 45 secured to or forming part of the gear wheel 22. Thus when the clutch member 41 is in mesh with the clutch member 45 then the rotary motion of the power or engine shaft 11 is transmitted in a reverse direction to the driven shaft 12 by way of the pinion 20, gear wheels 21 and 22, reversing shaft 14 and the pinions 30, 28 and 26. It is understod that the clutch members 35 and 41 are moved in unison and are normally in neutral position, that is, both clutch members 35 and 41 are out of engagement with the corresponding clutch members 38 and 45. When the connecting member 40 is shifted to the right then the clutch member 35 moves from neutral position into engagement with the clutch member 38, and when the connecting member 40 is shifted to the left then the clutch member 41 moves from neutral position into engagement with the clutch member 45. A clutch member 50 is mounted to slide on and to turn with the driven shaft 12 by the use of a key 51 and keyway 52, and this clutch member 50 is adapted to engage a clutch member 53 attached to or forming part of the gear wheel 21. A clutch member 55 is mounted to slide on and to turn with the countershaft 13 by the use of a key 56 and keyway 57, and this clutch member 55 is adapted to engage a clutch member 58 attached to or forming part of the gear wheel 27. The clutch members 35 and 55 are connected with each other by a connecting member 60 to move in unison, and the clutch members 35 and 55 are normally in neutral position to hold the clutch members 50 and 55 normally out of engagement with their coacting clutch members 53 and 58. When the connecting member 60 is moved to the left then the clutch member 50 moves from neutral position into engagement with the clutch member 53 whereby the driven shaft 12 is driven at first speed from the power or engine shaft 11 by way of the pinion 20 and gear wheel 21. When the connecting member 60 is moved to the right from neutral position then the clutch member 55 moves into engagement with the clutch member 58 to rotate the driven shaft 12 at second speed from the power or engine shaft 11 by way of the pinion 20, gear wheel 21, pinion 23, countershaft 13, gear wheel 27 and pinion 26.

The connecting members 40 and 60 are engaged by shifting levers 61 and 62 extending upwardly through slots 63, 64 formed in the top 65 of the gear casing 10. The levers 61 and 62 are mounted to swing loosely on a common pivot 66 mounted on lugs 67 forming part of the top 65. The lever 61 is provided at its upper end with a T-slot 68 and the upper end of the other lever 62 is provided with an inverted T-slot 69. The slots 68 and 69 are engaged by lugs 70 and 71 projecting sidewise from a sleeve 72 mounted to slide up and down on a lever 73 loosely fulcrumed on the pivot 66. The sleeve 72 and the lever 73 are connected by suitable mechanism with means under the control of the operator but imparting a transverse rocking to the lever 73 and an up and down sliding movement to the sleeve 72. The lever 73 is normally in vertical position and the sleeve 72 is normally in downward position at the time the connecting members 40 and 60 and their clutches 35, 41 and 50, 55 are in the normal position shown in the drawings. It will be noticed that when the sleeve 72 is in this position the lug 70 is at the bottom of the vertical member of the T-slot 68 while the lug 71 is in the horizontal member of the T-slot 69, and hence when a rocking movement is given to the lever 73 in the direction of the arrow $x$ (see Figures 1 and 4) then the connecting member 40 and the clutch members 35 and 41 are shifted to the right to engage the clutch member 35 with the clutch member 38 to drive the driven shaft 12 from the power or engine shaft 11 at a high speed. When the lever 73 is moved from neutral position in the direction of the arrow $x'$ (see Figure 4) then the connecting member 40 and the clutch members 35, 41 are shifted to the left to engage the clutch member 41 with the clutch member 45 to drive the driven shaft 12 from the power or engine shaft 11 in a reverse direction and at a low rate of speed. When the parts are in neutral position and the sleeve 72 is lifted then the lug 70 passes into the horizontal portion of the T-slot 68 while the lug 71 moves into the upper end of the vertical portion of the inverted T-slot 69, and when the lever 73 is now rocked in the direction of the arrow $x$ then the lug 70 travels in the horizontal portion of the T-slot 68 without affecting the lever 61, but the lug 71 now imparts a swinging movement to the lever 62 whereby the connecting member 60 and the clutches 50 and 55 are shifted to the right to engage the clutch member 55 with the clutch member 58 to drive the driven shaft 12 from the power or engine shaft 11 at second speed by way of the pinion 20, gear wheel 21, gear wheel 23, gear wheel 27 and pinion 26. When the lever 73 is shifted from neutral position in the direction of the arrow $x'$ (see Figure 5) and while the sleeve 72 is in raised position then the connecting member 60 and the clutches 50 and 55 are shifted to the left to engage the clutch member 50 with the clutch member 53 to drive the driven shaft 12 from the power or engine shaft 11 by way of the pinion 20 and the gear wheel 21. It is understood that, prior to making any changes, the lever 73 is moved to neutral position with both sets of clutch members 35, 41 and 50, 55 out of engagement with the corresponding clutch members 38, 45, 53, 58.

The change speed gearing shown and described is very simple and durable in construction and is exceedingly compact in the gear casing 10. It will also be noticed that but a single manipulating lever 73 with a sliding sleeve 72 thereon is actuated for making the various changes, that is, for transmitting the rotary motion of the power or engine shaft 11 to the driven shaft 12 either at first, second or high speed or in a reverse direction.

In practice, the clutch members 41, 45, 50, 53 and 55, 58 are preferably of the ratchet type while the clutch members 35, 38 for the direct transmission of the power at a high speed are of the square jaw type.

It is understood that the several gear wheels and pinions are proportioned to transmit the rotary motion of the power or engine shaft 11 to the driven shaft 12 at the desired predetermined speed.

Having thus described my invention, I claim as new and desire to secure by Letters Patent:—

1. A change speed gearing, comprising a power shaft, a driven shaft, two countershafts, two sets of gear wheels on the said shafts, and two sets of clutches, of which one set is adapted to connect the power shaft with the driven shaft to drive the driven shaft from the power shaft at either high speed or reverse, and the other set of clutches is adapted to connect the power shaft with the driven shaft to drive the driven shaft at either first or second speed, the clutches in the sets being so arranged that the clutches of a set are slidable as a unit.

2. A change speed gearing, comprising a power shaft, a driven shaft, two countershafts, two sets of gear wheels on the said shafts and two sets of clutches, of which one set is adapted to connect the power shaft with the driven shaft to drive the driven shaft from the power shaft at either high speed or reverse, and the other set of clutches is adapted to connect the power shaft with the driven shaft to drive the driven shaft at either first or second speed, shifting levers for the said sets of clutches, and an actuating lever having a shiftable member adapted to be moved into actuating position with either shifting lever, the clutches in the sets being so arranged that the clutches of a set are slidable as a unit.

3. A change speed gearing, comprising a power shaft, a driven shaft, two countershafts, two sets of gear wheels on the said shafts and two sets of clutches, of which one set is adapted to connect the power shaft with the driven shaft to drive the driven shaft from the power shaft at either high speed or reverse, and the other set of clutches is adapted to connect the power shaft with the driven shaft to drive the driven shaft at either first or second speed, shifting levers for the said sets of clutches, an actuating lever, the said levers having a common fulcrum, and the said actuating levers having T-slots, reversedly arranged one relative to the other, and a member slidable on the said actuating lever and having lugs engaging the said slots.

4. A change speed gearing, comprising a power shaft, a reversing shaft, a countershaft, a driven shaft, a set of gear wheels on the said power shaft, reversing shaft, countershaft and driven shaft, another set of gear wheels on the said power shaft, the said reversing shaft, countershaft and the said driven shaft and including a reversing pinion, a pair of clutches on the said power shaft and the reversing shaft to drive the latter from the power shaft at high speed or reverse, a second pair of clutches on the said driven shaft and the said countershaft to drive the driven shaft at first or second speed, and means for actuating either of the said sets of clutches.

GEORGE Q. SEAMAN, Jr.